Figure 6:
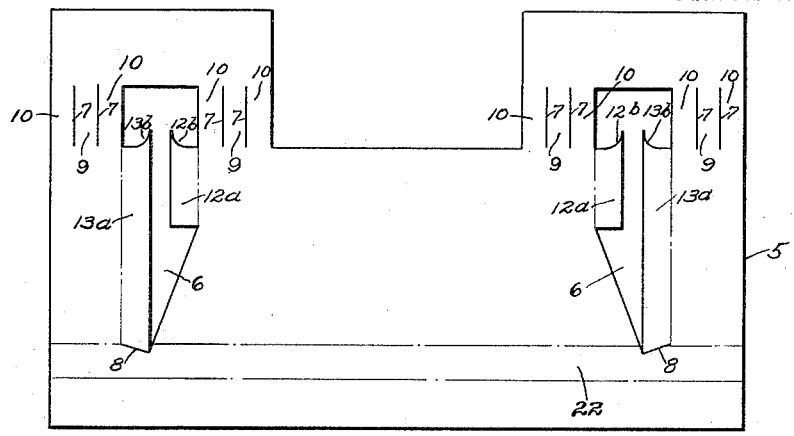

S. B. FIELD.
DROP HANDLE FOR BOXES.
APPLICATION FILED MAR. 20, 1913.
1,078,491.  Patented Nov. 11, 1913.
2 SHEETS—SHEET 1.
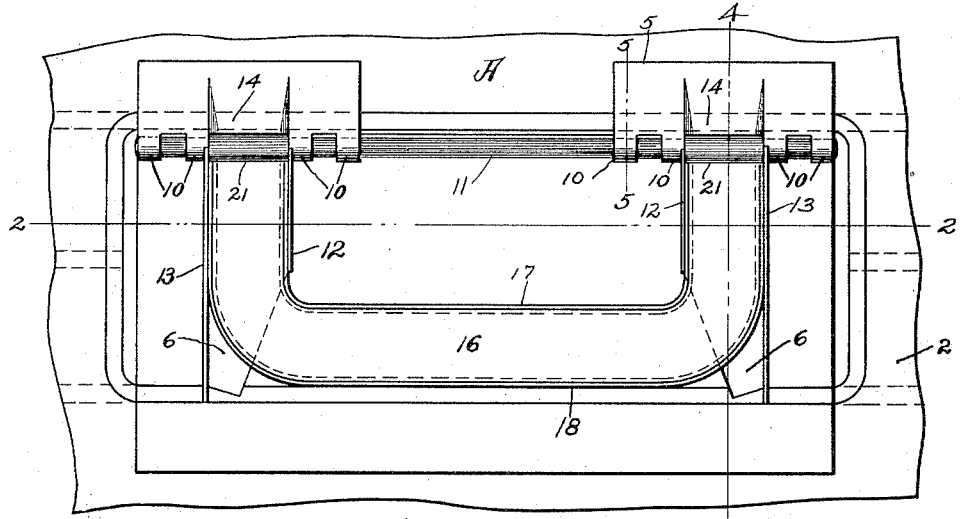
Fig. 1.
Fig. 2.
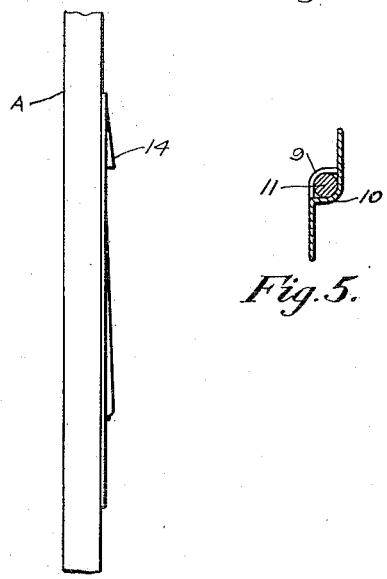
Fig. 3.
Fig. 5.
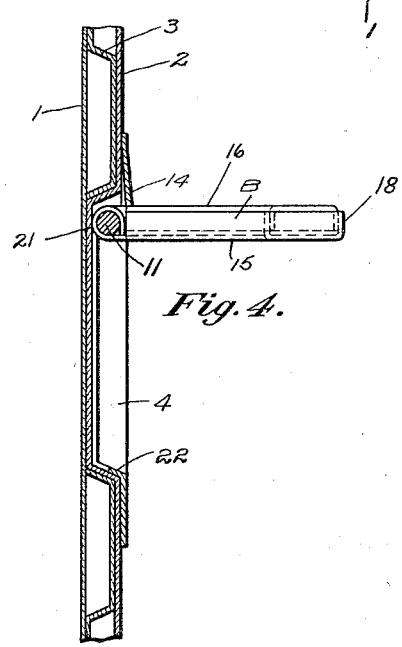
Fig. 4.
Witnesses:
Helen M. Purcell
John H. Parker
Inventor:
Samuel B. Field
by Macleod, Calver, Copeland & Dike
Attorneys

S. B. FIELD.
DROP HANDLE FOR BOXES.
APPLICATION FILED MAR. 20, 1913.

1,078,491. Patented Nov. 11, 1913.
2 SHEETS—SHEET 2.

Witnesses:
Helen M. Purcell
John H. Parker

Inventor:
Samuel B. Field
by Macleod, Calver, Copeland & Dike
attorneys.

UNITED STATES PATENT OFFICE.

SAMUEL B. FIELD, OF HOLBROOK, MASSACHUSETTS, ASSIGNOR OF ONE-FOURTH TO PNEUMATIC SCALE CORPORATION, LIMITED, OF QUINCY, MASSACHUSETTS, A CORPORATION OF MAINE, AND THREE-FOURTHS TO WILLIAM H. DOBLE, OF QUINCY, MASSACHUSETTS.

DROP-HANDLE FOR BOXES.

1,078,491.     Specification of Letters Patent.      Patented Nov. 11, 1913.

Application filed March 20, 1913. Serial No. 755,607.

*To all whom it may concern:*

Be it known that I, SAMUEL B. FIELD, a citizen of the United States, residing at Holbrook, county of Norfolk, State of Massachusetts, have invented a certain new and useful Improvement in Drop-Handles for Boxes, of which the following is a specification, reference being had therein to the accompanying drawings.

The invention relates to a drop handle for a box in which the handle is fulcrumed in a recess formed in the wall of the box to receive it so that there will be no projecting portion of the handle when it is in its drop position. It is especially adapted for use on the sides or ends of the box, where handles are employed on two opposite ends of the box. It is specially intended for use on boxes or shipping cases in which the panels are formed with inner and outer walls of metal, although not intended to be limited to boxes of that form of construction.

For the purpose of illustration and description of the invention the invention is shown in the drawings as applied to a panel of a double wall type of box above referred to.

The invention will be fully understood from the following description taken in connection with the accompanying drawings, and the novel features will be pointed out and clearly defined in the claims at the close of the specification.

Figures 7, 8:
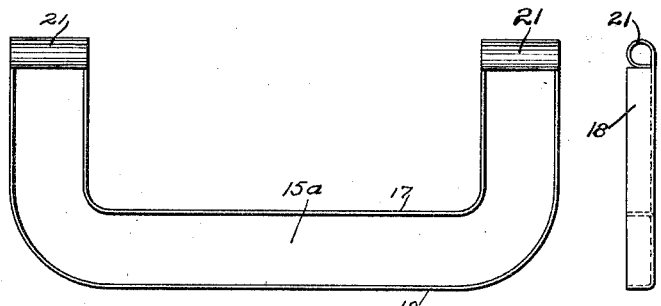
Figures 9, 10:
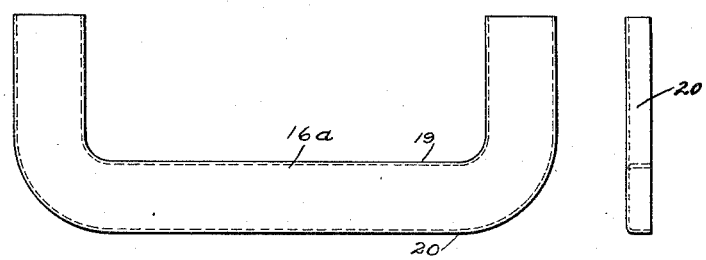

In the drawings,—Figure 1 is an elevation of a portion of a box panel with a handle embodying the invention, the handle being shown in the drop position. Fig. 2 is a section on line 2—2 of Fig. 1. Fig. 3 is an end view of the panel and handle shown in Fig. 1, viewed from the left of Fig. 1. Fig. 4 is a section on line 4—4 of Fig. 1, as it will appear when the handle is turned up into position for lifting the box. Fig. 5 is a section on line 5—5 of Fig. 1 looking to the right of Fig. 1. Fig. 6 is a plan of a blank sheet of metal blanked out in flat form which is to be formed into the bearing plate for the hinge pin of the handle. Fig. 7 is a plan of the body portion of the handle before it is assembled with the filling portion. Fig. 8 is an end view of the portion shown in Fig. 7. Fig. 9 is a plan of the filling portion of the handle. Fig. 10 is an end view of the portion shown in Fig. 9.

Referring now to the drawings,—the body of the panel A comprises an inner plate 1, an outer plate 2, and a corrugated strengthening and stiffening plate 3 interposed between the inner and outer walls of the panel, the corrugated plate, as will be seen, contacting alternately with the inner and outer wall plates 1, 2. The outer wall plate 2 is formed with a depression 4 to serve as a recess in which the handle and its bearings lie when the handle is in its drop position. The bearing plate is formed by an integral sheet of metal 5 blanked out and cut as shown in Fig. 6. The blank has a portion cut out forming an open space 6 of peculiar outline having relatively wide upper and lower portions and a narrower connecting neck portion, the lower wide portion, however, preferably tapering toward its lower end. On each side of the upper part of said open space the blank has a pair of parallel slits 7, 7. There is also formed a slit 8 extending into the metal from the lower end of the space 6. The blank is then shaped up by dies or other suitable means whereby the intermediate portion 9 between each pair of slits 7, 7 and the portion below the slits is bent back and the portions 10, 10 on the outer side of the slits 7, 7 and the portion above the upper ends of the slits is bent out with relation to the intermediate portion 9, as particularly shown in Figs. 1 and 5, so that the rounded out portions 10, 10 and the rounded in portion 9, form bearings for the hinge pin 11 of the handle. The portions $12^a$, $13^a$ on either side of the neck of the space 6 are bent out at right angles to the face of the plate, forming flanges 12, 13 for stiffening the body of the plate 5. The flanges 12 are shorter than the flanges 13 because the flanges 12 being on the inner side of the handle have to allow space for the handle to swing down against the plate. The lower end of the flange 13 along the slit 8 is cut at an angle so that it can fit against the inclined wall 22 of the recess in plate 5 so as to secure the greatest amount of stiffness. The portion of the blank above the head of the space 6, of a width about equal to the width of the space 6, is pressed out so that it forms an outwardly projecting stop member 14 whose lower end engages the handle B when the handle is turned up as in Fig. 4. The upper ends $12^b$, $13^b$ of the side portions $12^a$, $13^a$ which form the side flanges 12, 13 are preferably cut on a concave curve as shown in Fig. 6, so that when the sides are bent up to form the flanges these curved end portions will overlap the knuckle portions of the bearings 10, to serve both as a better finish and to help keep the bearings from being bent by the strain.

The handle B is formed of two sheets of metal 15ª, 16ª blanked out as shown in Figs. 7 and 9, each having an intermediate portion and two arm portions at substantially right angles to the middle portion. The body 15 of the handle is formed of the blank 15ª, shown in Fig. 7, having its side edges bent up to form side flanges or lips 17, 18 and the blank 16ª shown in Fig. 9 has its edges turned down forming downwardly projecting flanges 19, 20 which are adapted to fit inside of the flanges 17, 18 of the body portion 15 forming a filling 16 to give a smooth, finished appearance to the handle. The body portion 15 has the ends of its arms curled into rolls 21, 21 through which the hinge pin 11 passes.

It will be seen from Fig. 4 that the knuckle portions are curled upwardly, then over to the front instead of being curled in the reverse direction. It will thus be evident that when the box is lifted by the handles, the downward pressure of the weight being against the upward lift on the handles, although the stop 14 limits the upward turning of the handles, if there is any extra strain on the handle it will tend to curl the knuckles more completely instead of tending to uncurl them, and the greater the strain the more it will tend to curl up.

The bearing plate fits closely into the recess 4 in the panel and should be secured therein in some suitable manner. The preferred form is by welding it to the wall plate.

What I claim is:

1. A drop handle for a box or the like comprising a bearing plate formed with a plurality of knuckle bearings, a handle portion having two arms each curled at the end to form a bearing which fits into an interval between knuckle portions of the bearing plate, the knuckle portions of the bearing plate being integral with the body of the plate and struck up therefrom, each of said bearings comprising two struck up portions projecting from one face of the plate at a distance apart from each other, the intermediate portions between said two struck up portions being struck up in the opposite direction, and a hinge pin which passes through said knuckles of the bearing plate and bearings of the handle.

2. A drop handle for a box or the like comprising a bearing plate formed with a plurality of knuckle bearings struck up from the plate and integral therewith, a handle portion having two arms each curled at the end to form a bearing which fits into an interval between the bearing portions of said plate, and a hinge pin which passes through said bearing portions of the plate and handle, said bearing plate being formed with pressed out portions which project outwardly from the face of the plate beyond the bearings and form stops which are adapted to engage the upper face of the handle to limit the upward turning thereof.

3. A drop handle for a box or the like comprising a bearing plate formed with a plurality of knuckle portions integral therewith, a handle portion having two arms each curled at the end to form a bearing which fits into an interval between knuckle portions of the bearing plate, said bearing portions of the handle being curled from the back upward and then over toward the front, and a hinge pin which passes through the upper portions of the plate and of the handle.

4. A drop handle for a box or the like comprising a bearing plate formed with a plurality of knuckle portions integral therewith, a handle portion having two arms each curled at the end to form a bearing which fits into an interval between knuckle portions of the bearing plate, said bearing portions of the handle each being curled from the back upward and over toward the front, a hinge pin which passes through the bearing portions of the plate and of the handle, said bearing plate being formed with portions pressed outwardly toward the front which project outwardly beyond the face of the bearing plate and are adapted to engage the upper face of the handle when the handle is lifted to a horizontal position.

5. A drop handle for a box or the like comprising a bearing plate formed with a plurality of pairs of parallel slits, the intermediate portion between each pair of parallel slits being bulged out in one direction and the portions at the outer sides of said slits being bulged out in the opposite direction to form bearings integral with the plate, a handle portion having arms curled at each end to form bearings which fit into intervals between two of the said plate bearings and a hinge pin which passes through said bearings of the plate and the bearings of the handle portion.

6. In combination with a box having a wall comprising an inner and an outer plate spaced apart from each other, the outer plate being formed with a depression to receive a drop handle, a bearing plate secured to the said outer wall plate outside of the depression, said bearing plate being shaped to form a plurality of ears curled to form knuckle bearings which project over said depression in the wall plate, a handle portion having two arms each curled at the end to form a barrel which fits into an interval between knuckle portions of the bearing plate, and a hinge pin which passes through said knuckle portions of the bearing plate and through the barrel portions of the handle, said handle being adapted to swing on said hinge and to drop into said depression in the wall plate.

7. In combination with a box having a wall comprising an inner and an outer plate spaced apart from each other, the outer plate being formed with a depression to receive a drop handle, a bearing plate secured to the said outer wall plate outside of the depression, said bearing plate being shaped to form a plurality of ears curled to form knuckle bearings which project over said depression in the wall plate, a handle portion having two arms, each curled at the end to form a barrel which fits into an interval between knuckle portions of the bearing plate, a hinge pin which passes through said knuckle portions of the bearing plate and through the barrel portions of the handle, said handle being adapted to swing on said hinge and to drop into said depression in the wall plate, said bearing plate being also formed with pressed out flange portions which project over the upper side of the barrels of the handles and form stops which limit the upward turning of the handles.

8. A drop handle for a box or the like comprising a bearing plate formed with a plurality of knuckle portions struck up from the body of the plate and integral therewith, a handle portion having two arms each curled at the end to form a bearing which fits into an interval between two knuckle portions of the bearing plate, a hinge pin which passes through said knuckles and the bearing portion of the handle, said bearing plate being slotted and formed with flange portions struck up therefrom, and projecting outwardly from the face of the bearing plate on opposite sides of the arms of the handle.

9. A drop handle for a box or the like comprising a bearing plate formed with a plurality of knuckle portions, a handle portion having two arms each curled at the end to form a barrel which fits into an interval between two knuckle portions of the bearing plate, a hinge pin which passes through said knuckles of the bearing plate and the barrels of the handle, said bearing plate being formed with open spaces and with turned up flange portions on opposite sides of the open spaces which serve as stiffening members for the plate, said flanges being formed with concave upper ends which project over the bearings for the hinge pin.

In testimony whereof I affix my signature, in presence of two witnesses.

SAMUEL B. FIELD.

Witnesses:
HELEN M. PURCELL,
ALICE H. MORRISON.

---

Copies of this patent may be obtained for five cents each, by addressing the "Commissioner of Patents, Washington, D. C."